US012726533B2

(12) United States Patent
Sodagar

(10) Patent No.: US 12,726,533 B2
(45) Date of Patent: Sep. 1, 2026

(54) METHOD AND APPARATUS FOR SIGNALING INDIVIDUAL AND GROUP SERVICE OPERATION POINTS FOR MULTIPLE FORMATS IN 5G MEDIA STREAMING

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/440,434

(22) Filed: Feb. 13, 2024

(65) Prior Publication Data

US 2024/0275836 A1 Aug. 15, 2024

Related U.S. Application Data

(60) Provisional application No. 63/445,662, filed on Feb. 14, 2023.

(51) Int. Cl.
*H04L 65/1069* (2022.01)
*H04L 65/612* (2022.01)

(52) U.S. Cl.
CPC .................................. *H04L 65/612* (2022.05)

(58) Field of Classification Search
CPC ............... H04L 65/612; H04L 65/1069; H04L 65/1063; H04L 65/60; H04L 65/762
USPC .......................................................... 709/231
See application file for complete search history.

(56) References Cited

U.S. PATENT DOCUMENTS

2021/0105308 A1* 4/2021 Bouazizi ............. H04L 65/1016
2022/0368753 A1 11/2022 Sodagar
2023/0254267 A1* 8/2023 Kolan .............. H04W 28/0268 709/226

OTHER PUBLICATIONS

3GPP, "3rd Generation Partnership Project; Technical Specification Group Services and System Aspects; 5G Media Streaming (5GMS); General description and architecture (Release 18)", 3GPP TS 26.501 V18.0.0, Dec. 2022, pp. 1-143 (143 pages total).

"3rd Generation Partnership Project; Technical Specification Group Services and System Aspects; 5G Media Streaming (5GMS); Profiles, Codecs and Formats (Release 16)", 3GPP TS 26.511 V16.1.0, Sep. 2020 (33 pages).

"3rd Generation Partnership Project; Technical Specification Group Services and System Aspects; 5G Media Streaming (5GMS); Protocols (Release 16)", 3GPP TS 26.512 V16.2.1, May 2021 (135 pages).

(Continued)

*Primary Examiner* — Tan Doan
(74) *Attorney, Agent, or Firm* — Sughrue Mion, PLLC

(57) ABSTRACT

A method comprises receiving data defining one or more service operation points and one or more media entry points for a client to a $5^{th}$ generation media streaming (5GMS) application, in which the one or more service operation points includes at least one service operation point that is applied to each media entry point of the one or more media entry points, and in which the one or more service operation points are defined for a plurality of formats in the 5GMS application; selecting a media entry point from the one or more media entry points; and starting a media delivery session based on the selected media entry point.

18 Claims, 5 Drawing Sheets

(56) References Cited

OTHER PUBLICATIONS

Alberto Rico-Alvariño, et al., "3GPP Rel-17 Extensions for 5G Media Delivery", IEEE Transactions on Broadcasting, Jun. 2022, vol. 68, Issue 2 (4 pages) https://ieeexplore.ieee.org/abstract/document/9772755.

International Search Report issued May 31, 2024 in Application No. PCT/US24/15709.

Written Opinion issued May 31, 2024 in Application No. PCT/US24/15709.

European Search Report issued Feb. 19, 2026 in EP Application No. 24729952.2.

Thomas Stockhammer et al: "[5GMSA_Ph2] End-to-end low latency live streaming", 3GPP Draft; S4ai230004; Type Cr; 5GMS_Ph2, 3rd Generation Partnership Project (3gpp), Mobile Competence Centre ; 650, Route Des Lucioles ; F-06921 Sophia-Antipolis Cedex ; France , vol. SA WG4, No. Online; Dec. 8, 2022- Feb. 10, 2023, Dec. 21, 2022 (Dec. 21, 2022), XP052230374 (10 pages).

Richard Bradbury et al: "[5GMS_Ph2] Discussion on associating multiple media entry points with a 5GMS distribution configuration", 3GPP Draft; S4ai230020; Type Discussion; Tei17, Tei18, 5gms_Ph2, 3rd Generation Partnership Project (3gpp), Mobile Competence Centre ; 650, Route Des Lucioles ; F-06921 Sophia-Antipolis Cedex ; France , vol. SA WG4, No. Online; Dec. 8, 2022-Feb. 10, 2023, Jan. 10, 2023 (Jan. 10, 2023), XP052231179 (4 pages).

* cited by examiner

400

```
Media entries {

    Service operation point(s) 0_0-0_{n-1}

    Media entry 1 {

            -   entry point document or pointer to entry point document
            -   service operation point(s) 1_0-1_{k1-1}

            },

    Media entry 2 {

            -   entry point document or pointer to entry point document
            -   service operation point(s) 2_0-2_{k2-1}

            },

            ....

Media entry m {

            -   entry point document or pointer to entry point document
            -   service operation point(s) m_0-m_{km-1}

            }
```

METHOD AND APPARATUS FOR SIGNALING INDIVIDUAL AND GROUP SERVICE OPERATION POINTS FOR MULTIPLE FORMATS IN 5G MEDIA STREAMING

CROSS-REFERENCE TO RELATED APPLICATION

This application claims priority from U.S. Provisional Application No. 63/445,662, filed on Feb. 14, 2023, in the United States Patent and Trademark Office, the disclosure of which is incorporated herein by reference in its entirety.

FIELD

The disclosure generally relates to $5^{th}$ generation (5G) media streaming (5GMS), and, in particular, to a method and apparatus for signaling individual and group service operation points for multiple formats in 5G media.

BACKGROUND

The 3rd Generation Partnership Project (3GPP) TS26.501 defines a general architecture for uplink and downlink media streaming. 3GPP has also defined a service point for a single format in streaming architecture. The single format service points provide information about possible operational points to a client to stream the content using that specific format.

SUMMARY

According to one or more embodiments, a method performed by at least one processor comprises receiving a data structure defining one or more service operation points and one or more media entry points; selecting a media entry point from the one or more media entry points; and starting a media delivery session based on the selected media entry point, where the one or more service operation points includes at least one service operation point that is applied to each media entry point of the one or more media entry points.

According to one or more embodiments, a user equipment (UE) comprises at least one memory configured to store program code; and at least one processor configured to read the program code and operate as instructed by the program code, the program code including: receiving code configured to cause the at least one processor to receive a data structure defining one or more service operation points and one or more media entry points; selecting configured to cause the at least one processor to a media entry point from the one or more media entry points; and starting configured to cause the at least one processor to a media delivery session based on the selected media entry point, where the one or more service operation points includes at least one service operation point that is applied to each media entry point of the one or more media entry points.

According to one or more embodiments, a non-transitory computer readable medium having instructions stored therein, which when executed by a processor cause the processor to execute a method that comprises receiving a data structure defining one or more service operation points and one or more media entry points; selecting a media entry point from the one or more media entry points; and starting a media delivery session based on the selected media entry point, where the one or more service operation points includes at least one service operation point that is applied to each media entry point of the one or more media entry points.

BRIEF DESCRIPTION OF THE DRAWINGS

Further features, the nature, and various advantages of the disclosed subject matter will be more apparent from the following detailed description and the accompanying drawings in which:

FIG. 4 is a diagram of an example data structure defining service operation points and media entry points.

DETAILED DESCRIPTION

Figure 1:
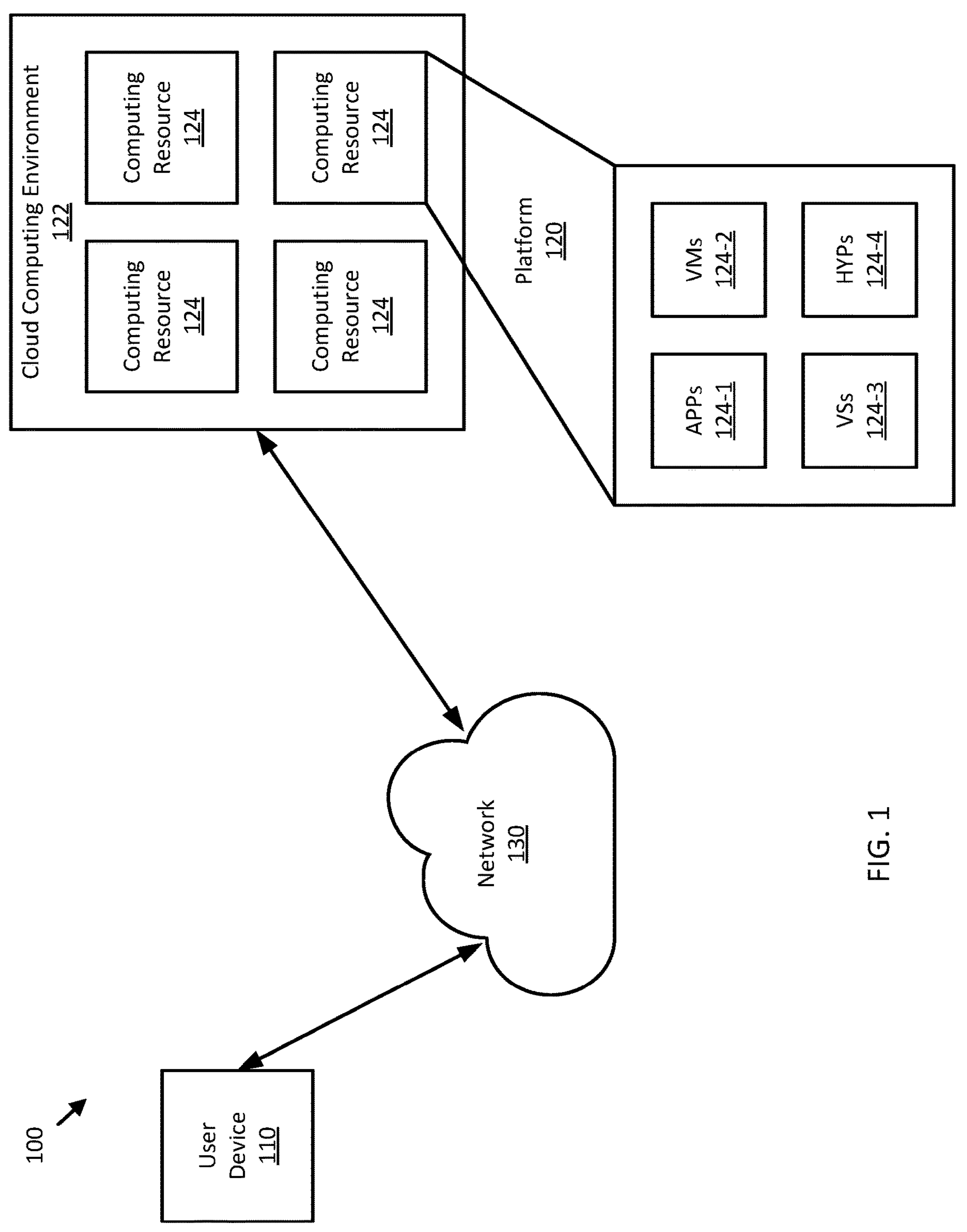
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
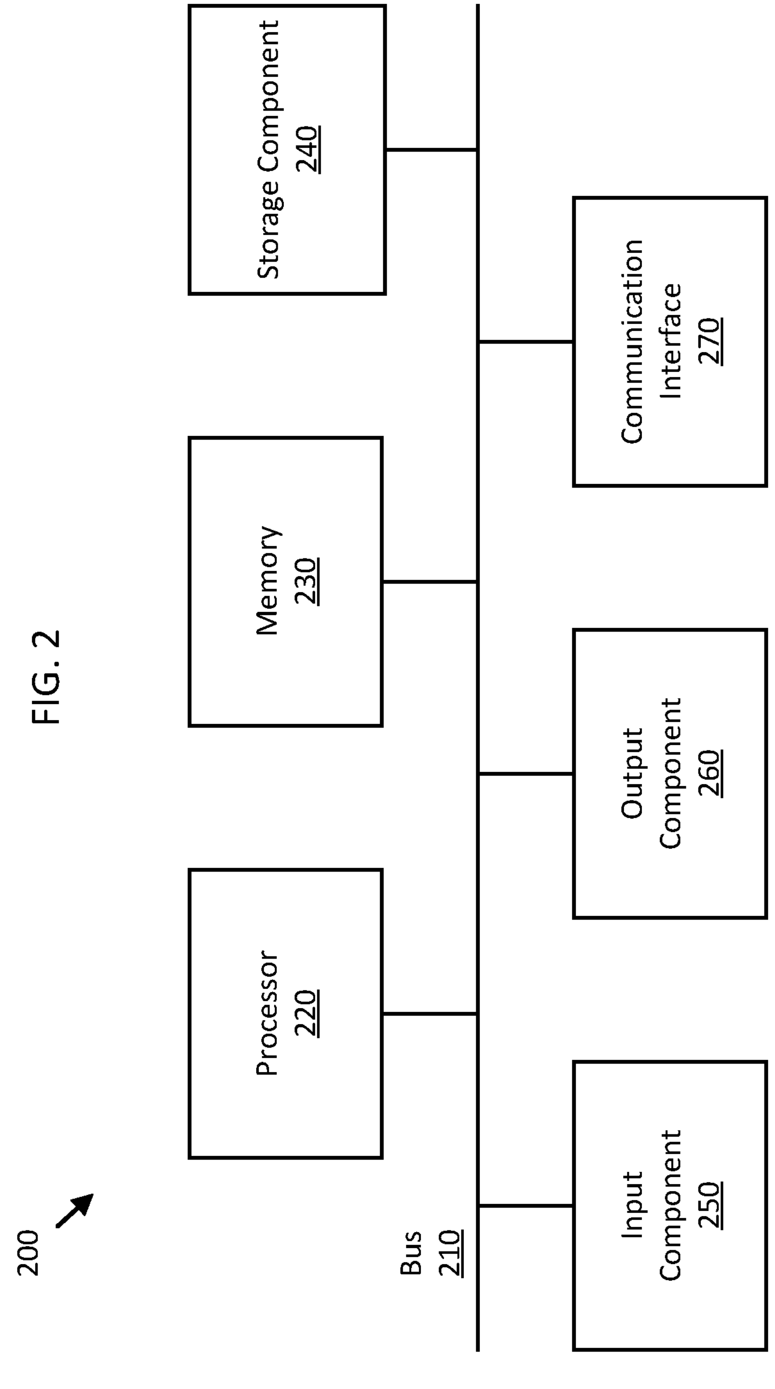
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, and stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
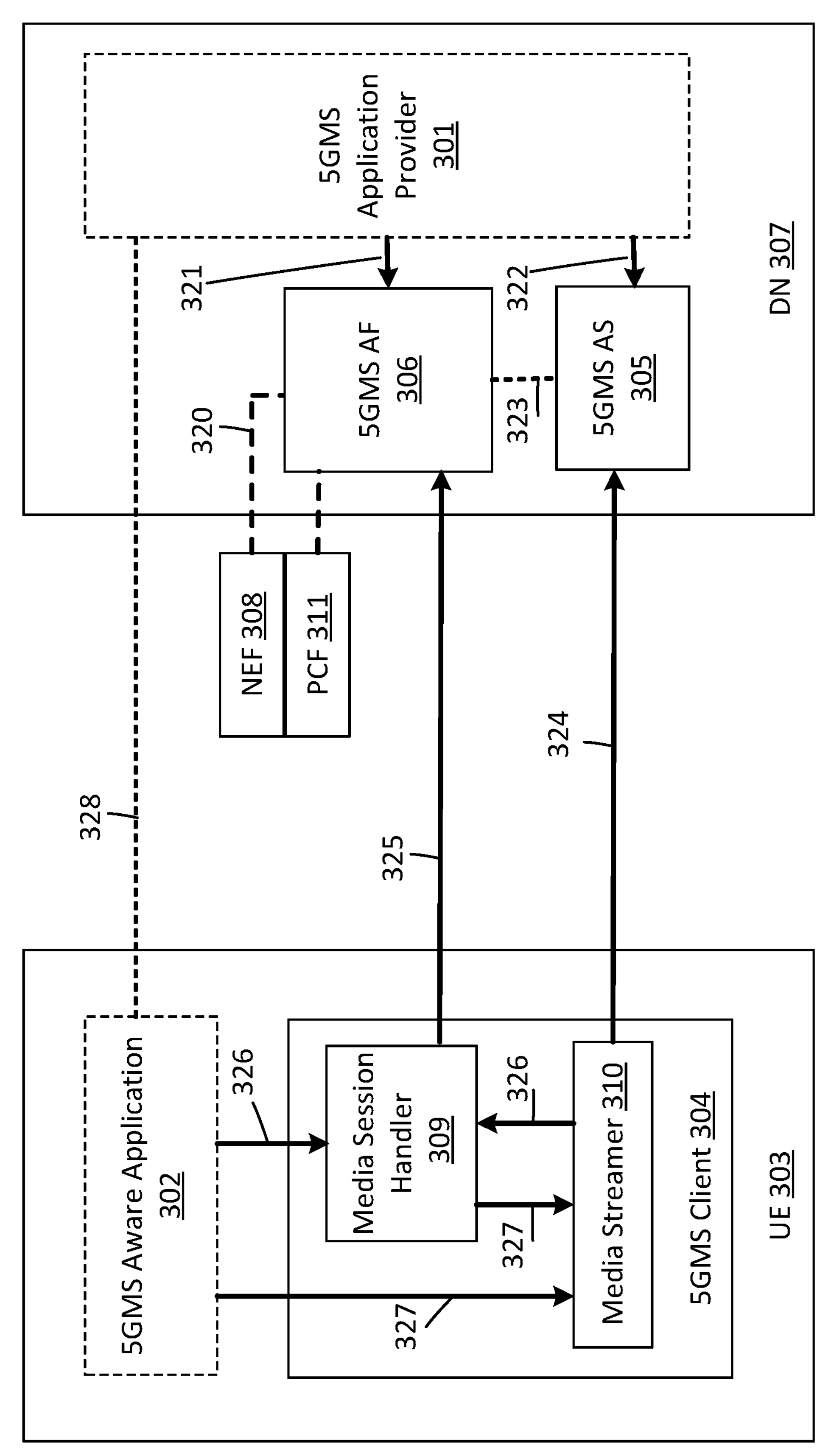
FIG. 3 is a diagram of a media architecture for media uplink streaming, according to embodiments.

FIG. 3 is a diagram of a media architecture 300 for media streaming according to embodiments. A 5GMS Application Provider 301 may use 5GMS for uplink streaming services. In one or more examples, a streaming service may be a live video streaming session using a social medial platform. The 5GMS Application Provider 301 may be implemented as a server. The 5GMS Application Provider 301 may provide a 5GMS Aware Application 302 on a UE 303 to make use of 5GMS Client 304 and network functions using interfaces and APIs defined in 5GMS. A 5GMS application server (AS) 305 may be an AS dedicated to 5G Media Uplink Streaming. The 5GMS Client 304 may be an internal function of the UE 303 dedicated to 5G Media Streaming.

A 5GMS application function (AF) 306 and the 5GMS AS 305 may be Data Network (DN) 307 functions. The 5GMS AF 306 may be implemented as a server. Functions in trusted DNs may be trusted by the operator's network. Therefore, AFs in trusted DNs may directly communicate with some or all 5G Core functions. Functions in external DNs may only communicate with 5G Core functions via a network exposure function (NEF) 308 using link 320. The NEF 308 facilitates secure access to exposed network services and capabilities of the 5G network.

The media architecture 300 may connect UE 303 internal functions and related network functions for 5G Media Streaming. Accordingly, the media architecture 300 may include a number of functions. For example, the 5GMS Client 304 on UE 303 may be an originator of a 5GMS service that may be accessed through interfaces/APIs. The 5GMS Client 304 may include two sub-functions, a Media Session Handler 309 and a Media Streamer 310. The Media Session Handler 309 may communicate with the 5GMS AF 306 in order to establish, control and support the delivery of a media session. The Media Session Handler 309 may expose APIs that may be used by the 5GMS Aware Application 302. The Media Streamer 310 may communicate with 5GMS AS 305 to stream the media content and provide a service to the 5GMS Aware Application 302 for media capturing and streaming, and the Media Session Handler 309 for media session control. The 5GMS Aware Application 302 may control the 5GMS Client 304 by implementing external application or content service provider specific logic and enabling the establishment of a media session. The 5GMS AS 305 may host 5G media functions and may be implemented as a content delivery network (CDN), for example. The 5GMS Application Provider 301 may be an external application or content specific media functionality (e.g., media storage, consumption, transcoding and redistribution) that uses 5GMS to stream media from the 5GMS Aware Application 302. The 5GMS AF 306 may provide various control functions to the Media Session Handler 309 on the UE 303 and/or to the 5GMS Application Provider 301. The 5GMS AF 306 may relay or initiate a request for a different policy control function (PCF) 311 treatment or interact with other network functions.

The media architecture 300 may include a number of different interfaces. For example, link 321 may relate to M1, which may be a 5GMS Provisioning API exposed by 5GMS AF 306 to provision usage of media architecture 300 and to obtain feedback. Link 322 may relate to M2, which may be a 5GMS Publish API exposed by 5GMS AS 305 and used when the 5GMS AS 305 in a trusted DN, such as DN 307, is selected to receive content for streaming service. Link 323 may relate to M3, which may be an internal API used to exchange information for content hosting on 5GMS AS 305 within a trusted DN such as DN 307. Link 324 may relate to M4, which may be a Media Streaming API exposed by the 5GMS AS 305 to the Media Streamer 310 to stream media content. Link 325 may relate to M5, which may be a Media Session Handling API exposed by 5GMS AF 305 to Media Session Handler for media session handling, control, and assistance that also include appropriate security mechanisms (e.g., authorization and authentication). Link 326 may relate to M6, which may be a UE 303 Media Session Handling API exposed by Media Session Handler 309 to 5GMS Aware Application 302 to make use of 5GMS functions. Link 327 may relate to M7, which may be a UE Media Streamer API exposed by Media Streamer 310 to the 5GMS Aware Application 302 and the Media Session Handler 309 to make use of the Media Streamer 310. Link 328 may relate to M8, which may be an Application API which is used for information exchange between 5GMS Aware Application 302 and 5GMS Application Provider 301, for example to provide service access information to the 5GMS Aware Application 302. The UE 303 may also be implemented in a self-contained manner such that interfaces M6 326 and M7 327 are not exposed.

The architecture illustrated in FIG. 3 defines how a client can use a streaming format to stream the content from the 5GMS Application provider through the 5GMS architecture. This architecture provides the entry point for that format through the service access information provided either through M8 or M5. The entry point is either a document or a pointer to a document that defines the streaming format. Recently, 3GPP considered adding multiple entry points for the same service using one or more formats. In this case, the service operation information includes the information regarding these entry points. The client chooses a format and uses the corresponding entry point to start streaming the content.

Embodiments of the present disclosure enabling various service points per media entry. Since not all media entries may support the same service points, the embodiments of the present disclosure provide a flexible solution that accommodates the following use cases: (1) a set of service points for all media entries; (2) a single service point per media entry, while multiple media entries are provided; and (3) a set of service points per media entry, while multiple media entries are provided.

Table 1 provides example streaming access parameters as part of the service access information.

TABLE 1

Streaming Access Parameters

| Parameters | Description |
|---|---|
| Media Player Entries | A set of documents or a set of pointers to a document, or mixed set of documents and pointers to the document, that each defines an equivalent media presentation, e.g. MPD for DASH content or URL to a video clip file. |
| Service Operation Point(s) | Optional detailed information about the parameters that are associated with the selected Service Description to support the requirements, such as latency and bitrate targets for one more Media Player entry defined above. |

The media entries are included in a hierarchical data structure. If a service operation point is outside of the media entries, then the service operation point may be applied to all media entries. For example, the service operation point outside of the media entries may be a global service operation point that is applied to all media entries. In one or more examples, the service operation point outside of the media entries may applied to a subset of the media entries. If a service operation point is included in a single media entry, then this service operation point is applied to that media entry. For example, a service operation point inside a media entry may be a local service operation point that is only applied to that media entry.

FIG. 4 illustrates an example data structure 400 that defines service operation points and media entries. As is shown in the data structure 400, there are service operation points $0_0$-$0_{n-1}$ that may be global and apply to all media entry points. In one or more examples, service operation points $0_0$-$0_{n-1}$ may apply to a subset of media entry points. In one or more examples, each media entry point may include an entry point document or an pointer to an entry point document. In one or more examples, each media entry point may include one or more service operation points that apply to that specific media entry point. For example, Media entry 1 includes service operation points $1_0$-$1_{k1-1}$ that apply only to Media entry 1. In one or more examples, a media entry does not include any service operation points. In one or more examples, the data structure 400 may not include any service operation points that are outside of the media entries.

Each media entry illustrated in FIG. 4 may correspond to a different streaming format. A streaming format may vary based on a type of delivery of media content as well as a type of device (e.g., TV, mobile phone, tablet) to which the media content is streamed.

Figure 5:
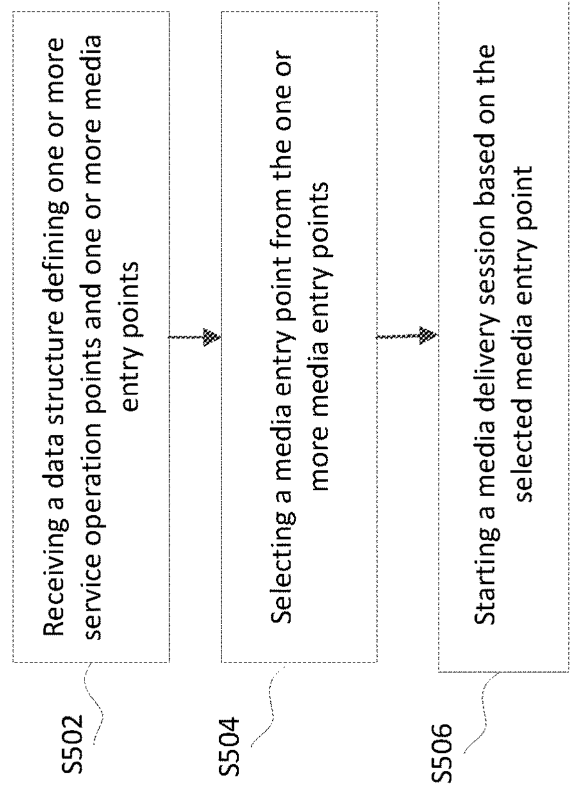
FIG. 5 is a flowchart of an example process of signaling service operation points and media entry points in multiple formats.

FIG. 5 illustrates an example process 500 for signaling service operation points and media entry points in multiple formats. The process 500 may be performed by the UE 303.

The process may start at operation S502 where a data structure is received defining one or more service operation points and one or more media entry points. In one or more examples, the received data structure may correspond to the data structure 400 (FIG. 4). In one or more examples, the data structure 400 may be received via service announcement over the M8 or M5 interface. For example, the data structure 400 may be included in a service announcement information provided by the 5GMS Application Provider 301 to the 5GMS Aware Application 302.

The process proceeds to operation S504 where a media entry point from the one or more media entry points is selected. For example, if the UE 303 is a mobile phone, the UE 303 may select the media entry point in the data structure 400 that is best suited for mobile phones.

The process proceeds to operation S506 where a media delivery session is started based on the selected media entry point. For example, if the UE 303 selects Media entry 1 in operation S504, the UE 303 may start the media delivery session using an entry point specified in an entry point document or a point to the entry point document for Media entry 1.

The proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above may be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The above disclosure also encompasses the embodiments listed below:

(1) A method performed by at least one processor, the method comprising: receiving a data structure defining one or more service operation points and one or more media entry points; selecting a media entry point from the one or more media entry points; and starting a media delivery session based on the selected media entry point, in which the one or more service operation points includes at least one service operation point that is applied to each media entry point of the one or more media entry points.

(2) The method according to feature (1), in which the one or more service operation points include at least one service operation point that is applied to only a subset of the one or more media entry points.

(3) The method according to feature (1) or (2), in which the one or more service points are applied to each of the one or more media entry points.

(4) The method according to any one of features (1)-(3), in which the one or more media entry points comprise (i) a first media entry point that includes at least one first service operation point and (ii) a second media entry point, and in which the at least one first service operation point does not apply to the second media entry point.

(5) The method according to any one of features (1)-(4), in which the one or more media entry points comprise at least one media entry point that does not include any service operation points.

(6) The method according to any one of features (1)-(5), in which each media entry point comprises one of an entry point document or a pointer to the entry point document.

(7) The method according to any one of features (1)-(6), in which the data structure is included in service access information provided through one of a M8 or a M5 interface.

(8) The method according to any one of features (1)-(7), in which the service operation point comprises one or more of a latency or a bit rate target of a corresponding media player entry.

(9) A user equipment (UE) comprising: at least one memory configured to store program code; and at least one processor configured to read the program code and operate as instructed by the program code, the program code including: receiving code configured to cause the at least one processor to receive a data structure defining one or more service operation points and one or more media entry points; selecting configured to cause the at least one processor to a media entry point from the one or more media entry points; and starting configured to cause the at least one processor to a media delivery session based on the selected media entry point, in which the one or more service operation points includes at least one service operation point that is applied to each media entry point of the one or more media entry points.

(10) The UE according to feature (9), in which the one or more service operation points include at least one service operation point that is applied to only a subset of the one or more media entry points.

(11) The UE according to feature (9) or (10), in which the one or more service points are applied to each of the one or more media entry points.

(12) The UE according to any one of features (9)-(11), in which the one or more media entry points comprise (i) a first media entry point that includes at least one first service operation point and (ii) a second media entry point, and in which the at least one first service operation point does not apply to the second media entry point.

(13) The UE according to any one of features (9)-(12), in which the one or more media entry points comprise at least one media entry point that does not include any service operation points.

(14) The UE according to any one of features (9)-(13), in which each media entry point comprises one of an entry point document or a pointer to the entry point document.

(15) The UE according to any one of features (9)-(14), in which the data structure is included in service access information provided through one of a M8 or a M5 interface.

(16) The UE according to any one of features (9)-(15), in which the service operation point comprises one or more of a latency or a bit rate target of a corresponding media player entry.

(17) A non-transitory computer readable medium having instructions stored therein, which when executed by a processor cause the processor to execute a method comprising: receiving a data structure defining one or more service operation points and one or more media entry points; selecting a media entry point from the one or more media entry points; and starting a media delivery session based on the selected media entry point, in which the one or more service operation points includes at least one service operation point that is applied to each media entry point of the one or more media entry points.

(18) The non-transitory computer readable medium according to feature (17), in which the one or more service operation points include at least one service operation point that is applied to only a subset of the one or more media entry points.

(19) The non-transitory computer readable medium according to feature (17) or (18), in which the one or more service points are applied to each of the one or more media entry points.

(20) The non-transitory computer readable medium according to any one of features (17)-(19), in which the one or more media entry points comprise (i) a first media entry point that includes at least one first service operation point and (ii) a second media entry point, and in which the at least one first service operation point does not apply to the second media entry point.

What is claimed is:

1. A method performed by at least one processor, the method comprising:

receiving data defining one or more service operation points and one or more media entry points for a client to a $5^{th}$ generation media streaming (5GMS) application, wherein each media entry point comprises one of an entry point document that defines a media presentation description for dynamic adaptive streaming over HTTP (DASH) or a pointer to a video clip file, wherein the one or more service operation points includes at least one service operation point that is a global service operation point that is applied to each media entry point of the one or more media entry points based on a location of the at least one service operation point in a hierarchical structure of the one or more media entry points, and wherein the one or more service operation points are defined for a plurality of formats in the 5GMS application;

selecting a media entry point from the one or more media entry points; and starting a media delivery session based on the selected media entry point.

2. The method according to claim 1, wherein the one or more service operation points include at least one service operation point that is applied to only a subset of the one or more media entry points.

3. The method according to claim 1, wherein the one or more service points are applied to each of the one or more media entry points.

4. The method according to claim 1, wherein the one or more media entry points comprise (i) a first media entry point that includes at least one first service operation point and (ii) a second media entry point, and wherein the at least one first service operation point does not apply to the second media entry point.

5. The method according to claim 1, wherein the one or more media entry points comprise at least one media entry point that does not include any service operation points.

6. The method of claim 1, wherein the data structure is included in service access information provided through one of a M8 or a M5 interface.

7. The method of claim 1, wherein the service operation point comprises one or more of a latency or a bit rate target of a corresponding media player entry.

8. A user equipment (UE) comprising:

at least one memory configured to store program code; and at least one processor configured to read the program code and operate as instructed by the program code, the program code including:

receiving code configured to cause the at least one processor to receive data defining one or more service operation points and one or more media entry points for a client to a $5^{th}$ generation media streaming (5GMS) application, wherein each media entry point comprises one of an entry point document that defines a media presentation description for dynamic adaptive streaming over HTTP (DASH) or a pointer to a video clip file, wherein the one or more service operation points includes at least one service operation point that is a global service operation point that is applied to each media entry point of the one or more media entry points based on a location of the at least one service operation point in a hierarchical structure of the one or more media entry points, and wherein the one or more service operation points are defined for a plurality of formats in the 5GMS application;

selecting code configured to cause the at least one processor to a media entry point from the one or more media entry points; and starting code configured to cause the at least one processor to a media delivery session based on the selected media entry point.

9. The UE according to claim 8, wherein the one or more service operation points include at least one service operation point that is applied to only a subset of the one or more media entry points.

10. The UE according to claim 8, wherein the one or more service points are applied to each of the one or more media entry points.

11. The UE according to claim 8, wherein the one or more media entry points comprise (i) a first media entry point that includes at least one first service operation point and (ii) a second media entry point, and wherein the at least one first service operation point does not apply to the second media entry point.

12. The UE according to claim 8, wherein the one or more media entry points comprise at least one media entry point that does not include any service operation points.

13. The UE according to claim 8, wherein the data structure is included in service access information provided through one of a M8 or a M5 interface.

14. The UE according to claim 8, wherein the service operation point comprises one or more of a latency or a bit rate target of a corresponding media player entry.

15. A non-transitory computer readable medium having instructions stored therein, which when executed by a processor cause the processor to execute a method comprising:

receiving data defining one or more service operation points and one or more media entry points for a client to a $5^{th}$ generation media streaming (5GMS) application, wherein each media entry point comprises one of an entry point document that defines a media presentation description for dynamic adaptive streaming over HTTP (DASH) or a pointer to a video clip file, wherein the one or more service operation points includes at least one service operation point that is a global service operation point that is applied to each media entry point of the one or more media entry points based on a location of the at least one service operation point in a hierarchical structure of the one or more media entry points, and wherein the one or more service operation points are defined for a plurality of formats in the 5GMS application;

selecting a media entry point from the one or more media entry points; and starting a media delivery session based on the selected media entry point.

16. The non-transitory computer readable medium according to claim 15, wherein the one or more service operation points include at least one service operation point that is applied to only a subset of the one or more media entry points.

17. The non-transitory computer readable medium according to claim 15, wherein the one or more service points are applied to each of the one or more media entry points.

18. The non-transitory computer readable medium according to claim 15, wherein the one or more media entry points comprise (i) a first media entry point that includes at least one first service operation point and (ii) a second media entry point, and wherein the at least one first service operation point does not apply to the second media entry point.

* * * * *